United States Patent Office 2,970,168
Patented Jan. 31, 1961

2,970,168

(ALKYLENEDISULFONYL)DITOLUATES

Christian F. Horn, New York, N.Y., and Harry Vineyard, South Charleston, W. Va., assignors to Union Carbide Corporation, a corporation of New York No Drawing. Filed Oct. 7, 1957, Ser. No. 688,414

12 Claims. (Cl. 260—470)

This invention relates to novel compounds that are useful in the preparation of plasticizers and high melting and readily dyeable synthetic textile fibers, molding resins and coating materials of high strength and excellent thermal stability.

The compounds of the invention are characterized by the general formula

I. 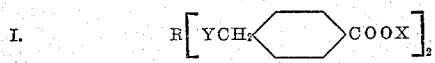

in which R is a saturated divalent hydrocarbon radical, the X's are hydrogen or saturated lower alkyl radicals, and the Y's are thio or sulfone groups.

The compounds that are particularly useful for forming synthetic textile fibers, molding resins, coating materials and plasticizers are those having a symmetrical structure and in which the X's are hydrogen or methyl groups, the Y's are sulfone groups and R is a straight or branched chain alkylene radical containing from two to ten carbon atoms. Higher alkyl diesters such as ethyl, propyl, etc. are also useful in the preparation of synthetic textile fibers so long as the terminal alkyl radicals are capable of forming alcohols boiling below about 200° C.

The diacids of the invention can be prepared in several ways. One method of preparation that has been found suitable involves reacting an alkylene dithiol, $R(SH)_2$, in which the R is as defined with reference to Formula I, with chloro-toluic acid,

in the presence of sodium hydroxide to form the corresponding dithio dicarboxylic acid. The corresponding disulfone dicarboxylic acid can be prepared from the dithio dicarboxylic acid by oxidation with peracetic acid or other suitable oxidizing agent. If a diester is desired, the dithio- or disulfonyl dicarboxylic acid, as the case may be, can be esterified with the appropriate alcohol. An entire sequence of reaction for forming the diacids and dimethyl esters is illustrated as follows:

II. 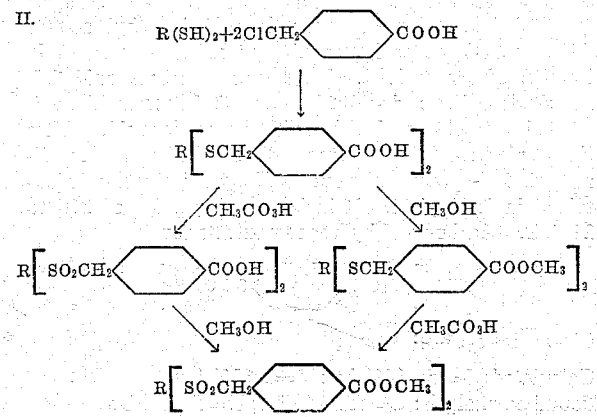

The compounds of the invention are distinguished by high thermal stability, a characteristic that is important in melt polymerization or copolymerization operations such as those involved in the preparation of synthetic textile fibers. The disulfone compounds are capable of forming excellent fibers by polycondensation with various diols and diamines and are also useful in modifying polyethylene terephthalate fibers and filaments to make them more receptive to dyeing without appreciably lowering their melting points.

These and other advantages, as well as the utility of the compounds of the invention, and a more detailed description of several methods of preparation, will become apparent from the following examples included to set forth the best modes now contemplated for carrying out the invention.

EXAMPLE 1

*Part A.—Preparation of 4,4'-(ethylenedithio)ditoluic acid*

Para-chloromethylbenzoic acid (281 grams), ethylene dimercaptan (77.5 grams) and ethanol (300 cc.) were placed into a three-liter four-neck flask equipped with dropping funnel, stirrer, thermometer and condenser, and the mixture was heated to 40° C. Sodium hydroxide solution (132 grams caustic in 500 cc. water) was added dropwise at 40 to 55° C. over a period of one hour. After completion of the addition, the solution was refluxed for six hours, acidified to pH 1 with concentrated hydrochloric acid. The precipitate, thus formed, was filtered and dried. The crude product was dissolved in one liter of dimethyl formamide, filtered (to remove the sodium chloride), cooled and filtered. After two more recrystallizations, 4,4'-(ethylenedithio)ditoluic acid was obtained in 72% yield. It had a melting point of 279° C.

*Part B.—Preparation of dimethyl 4,4'-(ethylenedithio)-ditoluate*

4,4'-(ethylenedithio)ditoluic acid (205 grams), methanol (3.5 liters) and concentrated sulfuric acid (940 grams) were heated to reflux for forty-four hours. The methanolic mixture was filtered and the crude filter cake material was recrystallized twice from acetonitrile after one treatment with activated carbon.

Dimethyl 4,4'-(ethylenedithio)ditoluate was obtained in 50% yield. It had a melting point of 136° C. Carbon and hydrogen contents for

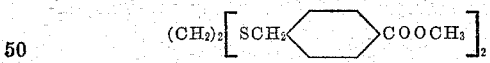

or $C_{20}H_{22}O_4S_2$ are:

Calculated: C=61.53% bw; H=5.68% bw.
Found on analysis: C=61.28% bw; H=5.76% bw.

*Part C.—Preparation of dimethyl 4,4'-(ethylenedisulfonyl)ditoluate*

Dimethyl 4,4'-(ethylenedithio)ditoluate (115 grams) was dissolved in dimethyl formamide (1.5 liters) in a three-liter four-neck flask equipped with stirrer, condenser, dropping funnel and thermometer. A 25% solution of peracetic acid in ethyl acetate (450 grams) was added dropwise at 55 to 60° C. over a period of 5.5 hours. Thereafter, the mixture was cooled and filtered. The precipitate was dissolved in dimethyl formamide (4 liters) and reoxidized with peracetic acid solution (150 grams) over a period of five hours at 60° C. to assure complete oxidation to the sulfone. The solution was cooled, forming a precipitate which was filtered and recrystallized three times from dimethyl sulfoxide.

Dimethyl 4,4'-(ethylenedisulfonyl)ditoluate was obtained in 63% yield. It had a melting point of 254.5° C. Carbon and hydrogen contents for

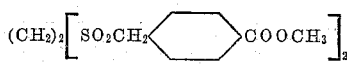

or $C_{20}H_{22}O_8S_2$ are:

Calculated: C=52.86% bw; H=4.88% bw.
Found on analysis: C=52.63% bw; H=4.99% bw.

EXAMPLE 2

*Preparation of dimethyl 4,4'-(trimethylenedisulfonyl)-ditoluate*

Methyl para-mercaptomethylbenzoate (182 grams) and trimethylene dibromide (101 grams) were charged into a one-liter four-neck flask equipped with stirrer, condenser, thermometer and dropping funnel. A methanolic solution of sodium hydroxide (40 grams in 300 cc. methanol) was added dropwise over a period of 1.5 hours at 25 to 35° C. The mixture was stirred for one hour at room temperature after the addition was completed. The precipitate which crystallized on cooling was filtered, dissolved in acetone, and freed from sodium bromide by filtration.

The dimethyl 4,4'-(trimethylenedithio)ditoluate thus obtained was then oxidized, while dissolved in acetone, to the sulfone by the dropwise addition of 25% peracetic acid solution in ethyl acetate (800 grams). The mixture was stirred for three hours at 50° C. after the peracetic acid addition had been completed. The solution was allowed to cool and the white precipitate was filtered. The crude sulfone, dissolved in dimethyl formamide (1 liter), was subjected to a second treatment with peracetic acid solution (225 grams) over a period of four hours at 95 to 110° C. The disulfone crystallized on cooling, was filtered and purified by two recrystallizations from dimethyl formamide.

Dimethyl 4,4' - (trimethylenedisulfonyl)ditoluate was obtained in 38% yield. It had a melting point of 257° C. Carbon and hydrogen contents for

or $C_{21}H_{24}O_8S_2$ are:

Calculated: C=53.84% bw; H=5.16% bw.
Found on analysis: C=54.07% bw; H=5.25% bw.

EXAMPLE 3

*Part A.—Preparation of 4,4'-(tetramethylenedithio)-ditoluic acid*

Para-chloromethylbenzoic acid (171 grams), tetramethylene dimercaptan (61 grams) and methanol (1 liter) were charged to a two-liter four-neck flask and an aqueous solution of sodium hydroxide (80 grams in 300 cc. water) was added dropwise as described in Part A of Example 1. After acidification the crude acid was recrystallized twice from dimethyl formamide and twice from acetic acid.

4,4'-(tetramethylenedithio)ditoluic acid was obtained in 75% yield. It had a melting point of 241° C. Carbon and hydrogen contents for

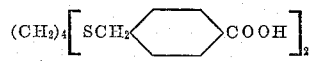

or $C_{20}H_{24}O_4S_2$ are:

Calculated: C=61.21% bw; H=6.17% bw.
Found on analysis: C=61.22% bw; H=5.90% bw.

*Part B.—Preparation of dimethyl 4,4'-(tetramethylene-dithio)ditoluate*

4,4'-(tetramethylenedithio)ditoluic acid (146 grams) was esterified in excess methanol (3.5 liters) and in presence of concentrated sulfuric acid (40 grams) as described in Part B of Example 1. The crude ester was decolorized with active carbon and recrystallized several times from methanol, acetonitrile, isopropanol and acetone.

Dimethyl 4,4'-(tetramethylenedithio)ditoluate was obtained in 50% yield. It had a melting point of 86° C.

*Part C.—Preparation of dimethyl 4,4'-(tetramethylene-disulfonyl)ditoluate*

Dimethyl 4,4' - (tetramethylenedithio)ditoluate (84 grams) was dissolved in dimethyl formamide (1.5 liters) and oxidized to the corresponding sulfone with 25% peracetic acid in ethyl acetate (330 grams) as described in Part C of Example 1. The crude compound was purified by two recrystallizations from dimethyl sulfoxide.

Dimethyl 4,4'-(tetramethylenedisulfonyl)ditoluate was obtained in 73% yield. It had a melting point of 255° C. Carbon and hydrogen contents for

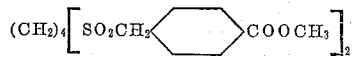

or $C_{22}H_{26}O_8S_2$ are:

Calculated: C=54.77% bw; H=5.43% bw.
Found on analysis: C=55.30% bw; H=5.43% bw.

EXAMPLE 4

*Part A.—Preparation of dimethyl 4,4'-(pentamethylene-dithio)ditoluate*

Methyl para-chloromethylbenzoate (184 grams) was reacted with pentamethylene dimercaptan (68 grams) in a one-liter four-neck flask by addition of sodium hydroxide solution (40 grams dissolved in 300 cc. methanol). After the addition at 40° C. was completed, the mixture was kept at this temperature for one-half hour and then cooled to room temperature. A solid material was filtered and dissolved in acetone (800 cc.) to remove sodium chloride. The crude dithio diester, obtained after evaporation of the acetone, was then recrystallized from methanol and isopropanol.

Dimethyl 4,4'-(pentamethylenedisulfonyl)ditoluate was obtained in 34% yield. It had a melting point of 76 to 78° C. Carbon and hydrogen contents for

or $C_{23}H_{28}O_4S_2$ are:

Calculated: C=63.86% bw; H=6.52% bw.
Found on analysis: C=64.17% bw; H=6.89% bw.

*Part B.—Preparation of dimethyl 4,4'-(pentamethylene-disulfonyl)ditoluate*

Dimethyl 4,4' - (pentamethylenedithio)ditoluate (120 grams) was dissolved in acetone (1 liter) and oxidized with 25% solution of peracetic acid in ethyl acetate (456 grams) according to the procedure described in Part C of Example 1. To assure complete oxidation the crude sulfone, dissolved in dimethyl formamide, was treated for a second time with peracetic acid. After three recrystallizations from dimethyl formamide dimethyl 4,4'-(pentamethylenedisulfonyl)ditoluate was obtained in 85% yield. It had a melting point of 215 to 217° C. Carbon and hydrogen contents for

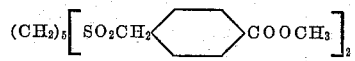

or $C_{23}H_{28}O_8S_2$ are:

Calculated: C=55.64% bw; H=5.65% bw.
Found on analysis: C=55.92% bw; H=5.82% bw.

EXAMPLE 5

Part A.—Preparation of 4,4'-(3-methylpentamethylenedithio)ditoluic acid

Para-chloromethylbenzoic acid (341 grams), 3-methylpentamethylene dimercaptan (150 grams) and ethanol (500 cc.) were placed in a five-liter four-neck flask. A solution of sodium hydroxide (160 grams dissolved in 1 liter water) was added dropwise according to the procedure described in Part A of Example 1. After acidification the crude acid was freed of some sodium chloride and recrystallized from acetic acid, dimethyl formamide and methanol.

4,4'-(3-methylpentamethylenedithio)ditoluic acid was obtained in 70% yield. It had a melting point of 173° C. Carbon and hydrogen contents for

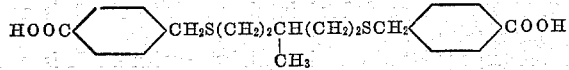

or $C_{22}H_{26}O_4S_2$ are:

Calculated: C=63.15% bw; H=6.26% bw.
Found on analysis: C=62.75% bw; H=6.22% bw.

Part B.—Preparation of dimethyl 4,4'-(3-methylpentamethylenedithio)ditoluate 4,4'-(3-methylpentamethylenedithio)ditoluic acid (280 grams) was esterified with methanol in presence of sulfuric acid in the manner described in Part B of Example 1, except that in this case the dimethyl ester dissolved readily in methanol. After fifty-three hours of esterification two-thirds of the methanol was removed and the residue poured into water which was then extracted with ether. The ether solution was dried over calcium chloride, filtered, and the ether was evaporated on the steam bath.

Dimethyl 4,4'-(3-methylpentamethylenedithio)ditoluate was obtained in 80% yield as a light yellow oily residue product. Carbon and hydrogen contents for

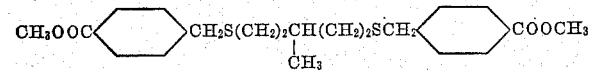

or $C_{24}H_{30}O_4S_2$ are:

Calculated: C=64.56% bw; H=6.77% bw.
Found on analysis: C=64.45% bw; H=6.42% bw.

Part C.—Preparation of dimethyl 4,4'-(3-methylpentamethylenedisulfonyl)ditoluate Dimethyl 4,4'-(3-methylpentamethylenedithio)ditoluate (248 grams) was dissolved in dimethyl formamide (2.5 liters) and oxidized to the corresponding disulfone with 25% peracetic acid in ethyl acetate (850 grams) in the manner described in Part C of Example 1. The crude disulfone was recrystallized three times from dimethyl formamide and twice from pyridine.

Dimethyl 4,4'-(3-methylpentamethylenedisulfonyl)ditoluate was obtained in 64% yield. It had a melting point of 205° C. Carbon and hydrogen contents for

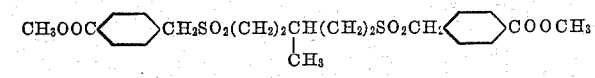

or $C_{24}H_{30}O_8S_2$ are:

Calculated: C=56.46% bw; H=5.92% bw.
Found on analysis: C=56.54% bw; H=5.72% bw.

EXAMPLE 6

Part A.—Preparation of dimethyl 4,4'-(hexamethylenedithio)ditoluate

Methyl para-mercaptomethylbenzoate (84 grams) was reacted with hexamethylene dichloride (36 grams) in presence of sodium hydroxide (18.5 grams dissolved in 250 cc. methanol) according to the procedure described in Example 2. The precipitated diester was filtered, dried and dissolved in acetone to remove sodium chloride. After evaporation of the acetone the diester was recrystallized from methanol and isopropanol.

Dimethyl 4,4'-(hexamethylenedithio)ditoluate was obtained in 47% yield. It had a melting point of 78° C. Carbon and hydrogen contents for

or $C_{24}H_{30}O_4S_2$ are:

Calculated: C=64.56% bw; H=6.77% bw.
Found on analysis: C=64.76% bw; H=6.40% bw.

Part B.—Preparation of dimethyl 4,4'-(hexamethylenedisulfonyl)ditoluate

Dimethyl 4,4'-(hexamethylenedithio)ditoluate (47 grams) was dissolved in acetone (400 cc.) and oxidized with 25% peracetic acid in ethyl acetate (170 grams) as described in Part B of Example 4. The crude disulfone was recrystallized once from a mixture of dioxane and dimethyl formamide (2:1) and twice from dimethyl formamide.

Dimethyl 4,4'-(hexamethylenedisulfonyl)ditoluate was obtained in 83% yield. It had a melting point of 223° C. Carbon and hydrogen contents for

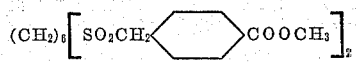

or $C_{24}H_{30}O_8S_2$ are:

Calculated: C=56.45% bw; H=5.92% bw.
Found on analysis: C=56.72% bw; H=5.79% bw.

EXAMPLE 7

Part A.—Preparation of 4,4'-(decamethylenedithio)ditoluic acid

Para-chloromethylbenzoic acid (207 grams) was reacted with decamethylene dimercaptan (125 grams) in ethanol-water mixture (400 cc. and 2000 cc.) by adding dropwise an aqueous solution of sodium hydroxide (97 grams in 500 cc. water) as described in Part A of Example 1. After acidification the crude thio dicarboxylic acid was filtered and then recrystallized once from dimethyl formamide and three times from pyridine.

4,4'-(decamethylenedithio)ditoluic acid was prepared in 80% yield. It had a melting point of 112° C.

Part B.—Preparation of dimethyl 4,4'-(decamethylenedithio)ditoluate 4,4'-(decamethylenedithio)ditoluic acid (170 grams) was suspended in methanol (3.5 liters) and esterified in presence of sulfuric acid in the manner described in Part B of Example 1. The mixture was filtered hot to remove impurities and the filtrate then cooled. The precipitate which formed in the filtrate was removed by filtration and recrystallized from acetonitrile. The diester melted at 84° C.

Part C.—Preparation of dimethyl 4,4'-(decamethylenedisulfonyl)ditoluate

Dimethyl 4,4'-(decamethylenedithio)ditoluate (30 grams) was dissolved in acetonitrile (700 cc.) and oxidized with 25% peracetic acid solution in ethyl acetate (91 grams) as described in Part C of Example 1. The crude sulfone was recrystallized from dimethyl formamide.

Dimethyl 4,4'-(decamethylenedisulfonyl)ditoluate was obtained in 84.5% yield. It had a melting point of 183° C. Carbon and hydrogen contents for the compounds prepared in this example are:

| | Carbon, percent | | Hydrogen, percent | |
|---|---|---|---|---|
| | Calc. | Found | Calc. | Found |
| $(CH_2)_{10}[SCH_2\langle\rangle COOH]_2$ or $C_{26}H_{34}O_4S_2$ | 65.80 | 65.71 | 7.22 | 7.08 |
| $(CH_2)_{10}[SCH_2\langle\rangle COOCH_3]_2$ or $C_{28}H_{38}O_4S_2$ | 66.91 | 66.81 | 7.62 | 7.46 |
| $(CH_2)_{10}[SO_2CH_2\langle\rangle COOCH_3]_2$ or $C_{28}H_{38}O_8S_2$ | 59.50 | 59.84 | 6.84 | 6.79 |

It is to be expected that numerous modifications will readily become apparent to those skilled in the art upon reading this description. All such modifications are intended to be included within the scope of the invention as defined in the appended claims.

We claim:

1. Compound having the general formula

wherein R is a saturated divalent alkylene hydrocarbon group containing from two to ten carbon atoms and the X's are members selected from the group consisting of hydrogen and lower alkyl radicals.

2. Compound as defined in claim 1 wherein R is a polymethylene chain containing from two to ten carbon atoms.

3. Compound as defined in claim 1 wherein R is a divalent ethylene radical.

4. Compound as defined in claim 1 wherein R is a trimethylene radical.

5. Compound as defined in claim 1 wherein R is a tetramethylene radical.

6. Compound as defined in claim 1 wherein R is a pentamethylene radical.

7. Compound as defined in claim 1 wherein R is a hexamethylene radical.

8. Compound as defined in claim 1 wherein R is a decamethylene radical.

9. Compound as defined in claim 1 wherein R is a branched chain alkylene radical containing up to ten carbon atoms.

10. Compound as defined in claim 1 wherein R is a 3-methylpentamethylene radical.

11. Compound as defined in claim 1 wherein the X's are methyl radicals.

12. Compound as defined in claim 1 wherein the X's are hydrogen.

References Cited in the file of this patent

UNITED STATES PATENTS

| | | |
|---|---|---|
| 2,393,327 | Langkammerer | Jan. 22, 1946 |
| 2,552,269 | Emerson et al. | May 8, 1951 |
| 2,571,251 | Jones | Oct. 16, 1951 |
| 2,640,848 | Harman et al. | June 2, 1953 |
| 2,657,231 | Klarer et al. | Oct. 27, 1953 |
| 2,720,502 | Caldwell | Oct. 11, 1955 |